INVENTOR.
CHARLES F. BUSH
BY
ATTORNEY

3,494,401
AIRCRAFT TIRE WITH IMPROVED COEFFICIENT OF FRICTION
Charles F. Bush, Cuyahoga Falls, Ohio, assignor to The Goodyear Tire & Rubber Company, Akron, Ohio, a corporation of Ohio
Filed Mar. 13, 1967, Ser. No. 622,515
Int. Cl. B60c 11/04
U.S. Cl. 152—209                                    13 Claims

ABSTRACT OF THE DISCLOSURE

A pneumatic tire specifically intended for use on an aircraft and of the well known type having a plurality of primary non-skid grooves extending about the rotational axis of the tire is provided with a materially increased coefficient of friction by the provision of additional relatively short grooves extending angularly of and from at least the majority, and preferably all, of the primary grooves. The additional short grooves associated with each primary groove extend in opposite directions laterally of the tread so as to provide at least a slight overlap between any short grooves extending from a next adjacent primary groove.

---

Figures 1, 2:
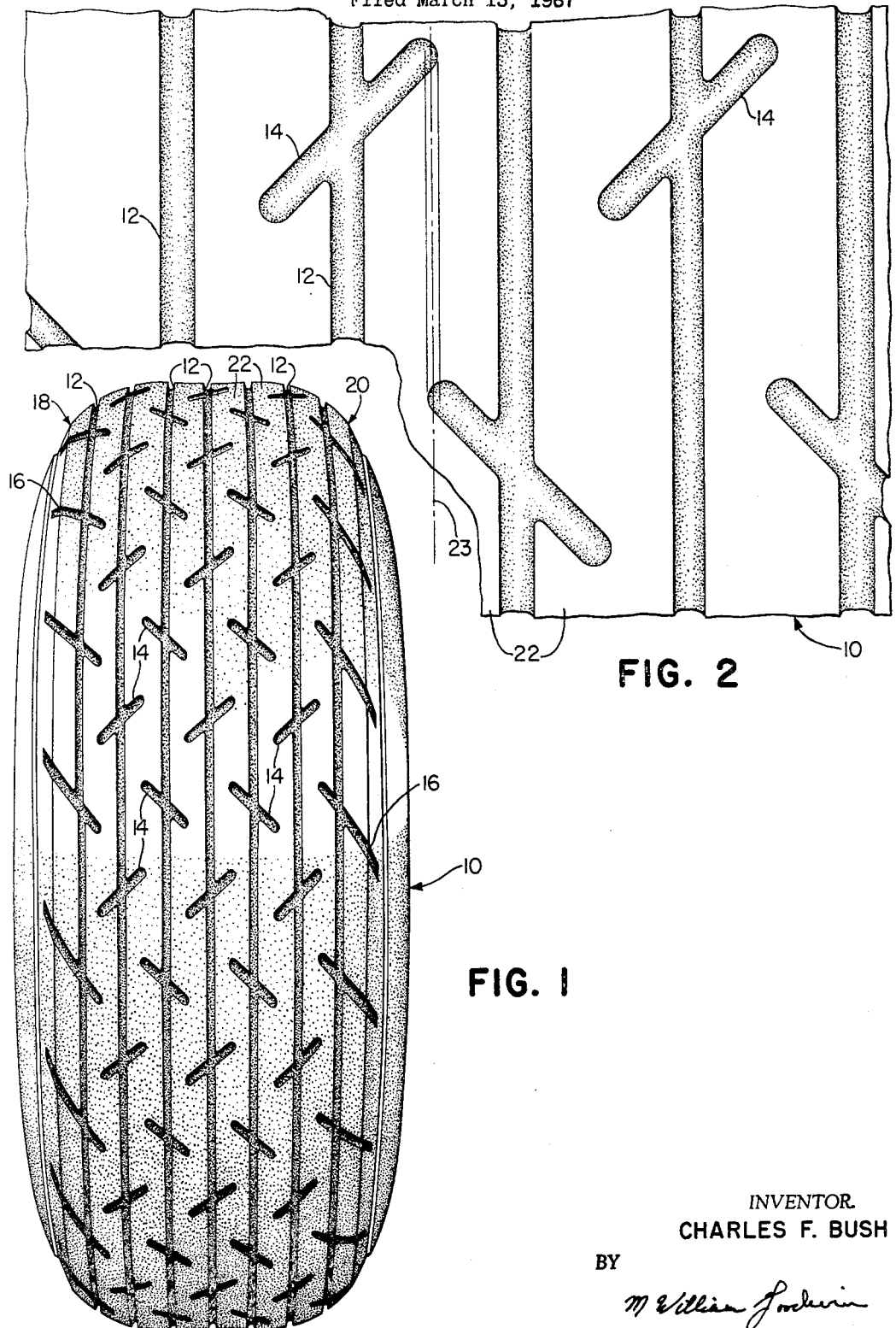

The foregoing abstract is not to be taken as limiting the invention of this application, and in order to understand the full nature and extent of the technical disclosure of this application, reference must be made to the accompanying drawing and the following detailed description.

This application relates to pneumatic tires specifically designed, constructed and intended for use on aircraft, and particularly on high speed jet aircraft having high landing and take-off speeds.

The high take-off and landing speeds; i.e., in excess of 100 m.p.h., of present jet aircraft make it essential that the tires for the aircraft provide the maximum obtainable coefficient of friction and resistance to hydroplaning if the safety of the passengers and aircraft is to be preserved. This has become particularly true with the advent of ground and air-borne systems permitting take-offs and landings in adverse weather conditions which may result in water, standing or otherwise, slush, etc., on the runway. The term coefficient of friction is used herein generally to define the ratio of the maximum tractive force both braking and cornering that can be obtained to control the aircraft along a runway surface to the "weight" on the tires. The "weight" on the tire includes the share of the total aircraft weight borne by the particular tire. The "weight" of the aircraft will vary with forward speed of the aircraft. It will thus be apparent that the greater the coefficient of friction for any tire loading, condition and/or type of runway surface, etc., the greater the margin of safety.

The term hydroplaning as used herein defines any one of three conditions. The first is what may be referred to as dynamic-hydroplaning and occurs when the aircraft proceeds through standing water at a velocity sufficient to cause a wedge of water to penetrate sufficiently into the tire footprint resulting in separation between the tire and runway. The speed at which dynamic-hydroplaning occurs is referred to as the hydroplaning velocity. At this speed essentially all directional stability is lost, and the coefficient of friction between the tire and runway is for all intents and purposes zero. The second type of hydroplaning may be referred to as viscous-hydroplaning and is the result if contaminated runways and is similar to a tire skidding on oil. The contamination may be caused by one or more of several factors, such as water providing a damp surface, dirt or dust, jet fuel, fire extinguisher foam, deposited rubber, etc. The third type of hydroplaning may be referred to as tread reversion and occurs when the tire skids along the runway at a speed sufficient to cause melting of the tread rubber, the molten rubber acting as a lubricant between the tire tread and runway. A tire which provides, at a speed somewhat below the hydroplaning velocity, a coefficient of friction greater than that of another tire should also have a higher hydroplaning velocity than the other tire. This is because the rate of decay of the coefficient of friction in either tire will be similar with the result that the tire with the higher coefficient of friction at a speed somewhat below hydroplaning velocity will have an effective zero coefficient of friction at a higher speed.

Several years prior to the present invention, rather extensive tests were conducted by the National Aeronautics and Space Administration with respect to the best performing tread pattern as regards coefficient of friction on various types of runway surfaces. The results of this testing were published by the National Aeronautics and Space Administration in its publication NASA TN D-1376, dated Sept. 19, 1962, and entitled "Influence of Tire Tread Pattern and Runway Surface Condition on Braking Friction and Rolling Resistance of a Modern Aircraft Tire." This publication is obtainable from the National Aeronautics and Space Administration, Washington, D.C., U.S.A.

The above referenced publication reported the testing of a variety of tread patterns, including a tread having grooves extending laterally and spaced circumferentially of the tread, treads having diamond patterns of large and small size, treads having a plurality of continuous grooves of different numbers extending about the rotational axis of the tire, a tire with a dimple tread pattern and a combination of a dimple tread pattern with lateral grooves. The published conclusions were that a tire with continuous circumferential grooves provided the highest coefficient of friction with respect to wet, or contaminated, runways. It has been the practice for a number of years to provide at least the greater majority of aircraft tires with a tread pattern consisting of from three to nine continuous circumferential grooves. While such a tread pattern provided the best then known means for obtaining the optimum coefficient of friction and hydroplaning velocity, nonetheless, an improvement was and is desirable and sought after.

Accordingly, it is a primary object of the present invention to provide a tire specifically intended for use on aircraft which has a significantly increased coefficient of friction with respect to wet and/or contaminated runways.

Included within the primary object is the object of providing a means and method for materially increasing the coefficient of friction of an aircraft tire of the type having at least three circumferentially extending and continuous primary non-skid grooves in its tread.

Other objects will be in part obvious, and in part pointed out more in detail hereinafter.

In the drawing:
FIGURE 1 is an elevational view of an aircraft tire having a tread pattern of the present invention; and
FIGURE 2 is an enlarged, fragmentary, plan view of the tread pattern of the tire of FIGURE 1.

With reference to the drawing, the tire shown therein comprises a tread portion generally indicated at 10. In a manner and for reasons well known, the tread is provided with a plurality of, and at least three, primary non-skid grooves as indicated at 12. The primary gooves 12, in the specific embodiment shown, are continuous and parallel with each groove 12 lying in a general plane extending at right angles to the rotational axis of the tire. However, the primary grooves may extend at a relatively small angle, for example 25 degrees, to the centerline of the tread. Therefore, when the tread pattern of this invention is described as including primary grooves extending about the tire axis, it is meant to include grooves extending at a relatively small angle to the tread centerline as well as circumferentially extending grooves. An aircraft tire, as thus far described, and particularly a tire having a tread pattern consisting of continuous non-skid grooves disposed in parallel spaced relationship to define intervening ribs, has heretofore been generally accepted as providing the optimum coefficient of friction and hydroplaning velocity on wet or contaminated runways.

In accordance with the present invention, the tread pattern, as thus far described, is further provided with a plurality of additional grooves as indicated in FIGURE 1, at 14 and 16. Each of the additional grooves extends angularly of one of the primary grooves 12 and extends from the primary groove in the sense that the additional groove opens into the primary groove. In the specific embodiment shown there are a plurality of additional grooves 14 or 16 associated with each of the primary grooves 12 and each extending at an angle of 45° to the respective primary groove. However, the angularity of and between the grooves 14, 16 may be varied without departing from the scope of this invention. The grooves 16 are associated with the grooves 12 disposed next adjacent the lateral edges of the ground contacting portion of the thread which extends laterally from a point generally indicated at 18 and to the point generally indicated at 20 in FIGURE 1 and, of course, entirely circumferentially of the tread. The grooves 14 are associated with the primary grooves 12 disposed between the laterally outermost grooves 12. The grooves 14 and 16 respectively associated with a groove 12 are spaced apart longitudinally of the respective groove 12 a distance quite substantially greater than the width of the additional groove and are preferably spaced equi-angularly about the tire rotational axis. The grooves 14 and 16 have a width of at least ⅛ inch and are preferably of approximately the same width of the primary grooves 12. Also the depth of the grooves 14 and 16 is preferably at least approximately the same as the depth of the respectively associated primary grooves 12.

In the specific embodiment shown each of the additional grooves 14 and 16 is straight and crosses, so as to extend in opposite directions from, its respective primary groove 12. However, it is within the scope of the present invention to provide a relative displacement of the portions of each additional groove associated with and disposed on opposite sides of a primary groove in a direction circumferentially of the tire, so that the additional grooves extend in opposite directions even though the oppositely directed portions of the grooves are not aligned. Further, in accordance with the present invention, the additional grooves 14 or 16 respectively associated with the primary groove of each pair of next adjacent primary grooves, each extend from its respective primary groove toward a next adjacent primary groove a distance at least slightly greater than one-half the width of the rib 22 bounded and defined by the respectively associated pair of next adjacent primary grooves. This extension of each additional groove at least slightly beyond the centerline 23 of a next adjacent rib assures that there will be a slight overlapping, laterally of the tread, of additional grooves associated with one primary groove and the additional grooves associated with a next adjacent primary grove. This assures that the intervening rib between each next adjacent pair of primary grooves will be discontinuous in any plane parallel to the general planes of the next adjacent pair of primary grooves and passing through the intervening rib. While the additional grooves might be extended beyond the centerline of any one rib, and into a next adjacent primary groove, the dynamic integrity of the tire may in some cases be adversely affected thereby. The grooves 16 associated with the outermost primary grooves 12 each extends from the respectively associated primary groove in a direction axially outwardly of the tire and toward the next adjacent lateral edge of the tread and at its outer end is open to permit the expulsion of water laterally beyond the tread.

In the embodiment shown in the drawing, the additional grooves 14 and 16 of next adjacent primary grooves 12 are inclined relative to the centerline of the tread in opposite directions, although at equal angles. However, it is within the scope of the invention to incline all of the additional grooves 14 and 16 in the same direction, or to incline the groves in one area of the tire in one direction and the grooves in another area of the tire in another direction with such areas not being specifically limited to individual primary grooves.

Testing of a tire having a tread pattern generally as shown and described in connection with FIGURES 1 and 2 and in a manner generally similar to the tests reported in the aforementioned National Aeronautics and Space Administration publication, revealed that an aircraft tire having a plurality of circumferential continuous primary grooves could be provided with a very significantly increased coefficient of friction by the provision of additional angularly related grooves as described above. In this testing, comparisons were made between a conventional aircraft tire having a tread pattern consisting of seven continuous circumferential grooves with intervening ribs and a tire having a similar tread pattern but in addition being provided with cross grooves such as described and shown herein. The tires tested were of a 49 x 17 size appropriately loaded and inflated. The tires were run on various types of runway surfaces, at different speeds and under runway conditions of standing water and damp surface. Measurements were made to determine several indications including the average and maximum coefficient of friction and also the coefficient of friction while the tire was in a skid. Average coefficient of friction as used herein refers to the average value of the coefficient of friction developed between tire slip ratios of 0.1 and 0.5. Maximum coefficient of friction as used herein refers to the maximum coefficient of friction developed between slip ratios of 0 and 1. The slip ratio is defined as the ratio of the relative skidding velocity of the tire to the horizontal velocity of the tire axle and for a freely rotating tire is effectively zero while for a completely braked tire or locked wheel (full skid) equals 1. The relative skidding velocity of a tire is defined as the difference between the peripheral velocity of the tire and the horizontal velocity of the wheel axle. The coefficient of friction in a skid is defined as the coefficient of friction at a slip ratio of 1. All testing was conducted at slightly below dynamic-hydroplaning velocity (about 15 knots below). By way of example, the test results on a burlap finished concrete surface were as follows:

MAXIMUM COEFFICIENT OF FRICTION

| Runway condition | Speed (knots) | Percentage improvement in coefficient of friction |
|---|---|---|
| .3″ water | 40 | 43 |
|  | 100 | 60 |
| Damp | 40 | 6 |
|  | 100 | 53 |

AVERAGE COEFFICIENT OF FRICTION

| Runway condition | Speed (knots) | Percentage improvement in coefficient of friction |
|---|---|---|
| .3″ water | 40 | 50 |
|  | 100 | 50 |
| Damp | 40 | 7 |
|  | 100 | 90 |

COEFFICIENT OF FRICTION SKID CONDITIONS

| Runway condition | Speed (knots) | Percentage improvement in coefficient of friction |
|---|---|---|
| .3″ water | 40 | 19 |
|  | 100 | 17 |
| Damp | 40 | 16 |
|  | 100 | 86 |

As mentioned above it is preferred that the additional grooves be provided in association with each of the primary grooves. However, this is not to say that some improvement will not be obtained if less than all of the primary grooves are provided with the additional cross grooves. The maximum number of cross grooves to be provided for any one primary groove, together with the maximum width of the cross grooves (as well as the width of the primary grooves), and the length of the cross grooves, is dictated by the dynamic performance of the tire, particularly with respect to structural integrity and tread throw-off or chunking, and also by the desire not to reduce the amount of tread rubber in contact with the runway in the footprint area of the tire to the point where tire performance is adversely affected. The footprint area is, as is well known, the area of the tire in contact with the ground at any one time. In this connection, however the additional grooves should, at least preferably, be spaced sufficiently close together along any one primary groove, or in any series of additional grooves extending circumferentially of the tire, that at least two cross grooves of any circumferential series thereof are in the footprint at any one time. Additionally, it is preferred that there be at least two overlapped cross grooves in the footprint at any one time and in each rib, so that each rib will be discontinuous in any footprint of the tire. The foregoing criteria still permits the cross grooves in any one series thereof associated with a particular primary groove to be spaced apart at least several times the width of the cross grooves, and preferably at least 8 to 10 times the cross groove width, and thus at least a distance of one inch. The test tire mentioned above, for example, had the following principal approximate dimensions:

| | |
|---|---|
| Diameter (mean) in | 48.23 |
| Section width (mean) in | 16.85 |
| Number of primary grooves | 7 |
| Spacing of primary grooves or width of intervening ribs in | 1.5 |
| Width of primary grooves in | .440 |
| Number of additional grooves per primary groove | 20 |
| Width of cross grooves in | .440 |
| Angle of cross grooves, degree to primary groove | 45 |
| Extension of cross grooves into next adjacent rib in | .815 |

Thus it will be seen that there has been provided novel and improved means for very significantly increasing the coefficient of friction of the previously considered optimum tread pattern for a high speed aircraft tire. The method of accomplishing this marked improvement may be either by providing the additional grooves in the tire as originally manufactured, or when the tire is retreaded, and if desired an existing conventional tire could have the additional grooves provided, for example, by the use of a hot re-grooving tool.

Inasmuch as different embodiments of this invention could be made or practiced without departing from the scope thereof, it is intended that all matter contained in the above description or shown in the accompanying drawing shall be interpreted as illustrative and not necessarily in a limiting sense.

It is also to be understood that the language in the following claims is intended to cover all of the generic and specific features of the invention herein described and all statements of the scope of the invention which, as a matter of language, might be said to fall therebetween.

What is claimed is:

1. In a pneumatic tire specifically intended for use on an aircraft, a ground contacting tread portion provided with at least three primary non-skid grooves defining intervening ribs and extending in a direction about the rotational axis of the tire, means for providing the tire with an increased coefficient of friction, comprising means providing a plurality of additional grooves in said ground contacting portion, each additional groove having a width of at least ⅛ inch and extending angularly of and from a primary groove, the additional grooves extending from any one primary groove being spaced apart about said axis a distance of at least one inch, each said additional groove terminating substantially short of each primary groove next adjacent the primary groove respectfully associated with said additional groove.

2. An aircraft tire as described in claim 1 in which a plurality of said additional grooves extend from each of at least a next adjacent pair of primary grooves, said primary grooves being continuous about said axis, at least a portion of the additional grooves respectively associated with each primary groove of said pair extending in a direction generally toward the other primary groove of said pair a distance sufficient to overlap laterally of the tread the additional grooves extending in the opposite direction from the other of said pair of primary grooves, thus to provide that the rib bounded by said pair of primary grooves is discontinuous in any plane passing through said rib and lying at right angles to said rotational axis.

3. An aircraft tire as described in claim 1 in which a plurality of said additional grooves are respectively associated with each of said primary grooves.

4. An aircraft tire as described in claim 1 in which the additional grooves associated with any one primary groove extend generally in opposite directions laterally of said one primary groove.

5. An aircraft tire as described in claim 1 in which each of said additional grooves extends generally in opposite directions from one ofs aid primary grooves and generally laterally of said ground contacting portion.

6. An aircraft tire as described in claim 1 in which the additional grooves have a depth substantially the same as the depth of primary grooves respectively associated therewith.

7. An aircraft tire as described in claim 1 in which said primary grooves are continuous about said axis, a plurality of said additional grooves extending from at least the majority of said primary grooves, each of said additional grooves which extends from one primary groove toward a next adjacent primary groove extending at least beyond the circumferential centerline of the rib bounded by said one and next adjacent primary groove.

8. An aircraft tire as described in claim 1 in which a plurality of said additional grooves are provided for each of the two primary grooves lying closest to the lateral edges of said ground contacting portion, the additional grooves associated with each of said two primary grooves extending generally axially outwardly of the tire from the respective primary groove and toward the next adjacent one of said lateral edges and being open ended at their outer ends.

9. An aircraft tire as described in claim 2 in which a plurality of said additional grooves are provided for at least the majority of said primary grooves, the additional grooves associated with each said next adjacent pair of primary grooves being of sufficient number and being spaced about said axis a distance to provide that there will be with respect to each rib bounded by one of said next adjacent pair of grooves at least a pair of overlapping additional grooves in the footprint of the tire when the tire is loaded to its rated loading.

10. An aircraft tire as described in claim 9 in which a plurality of said additional grooves are associated with each of said primary grooves, the additional grooves associated with each primary groove extending generally in opposite directions laterally of said tread, at least a portion of the additional grooves respectively associated with each of the two primary grooves lying closest to the lateral edges of said ground contacting portion extending outwardly of the tire toward the next adjacent one of said lateral edges and opening axially outwardly of the tire at said next adjacent one of said lateral edges, each said additional groove terminating substantially short of each primary groove next adjacent its respective primary groove.

11. A method of susbtantially increasing the coefficient of friction and thus the hydroplaning velocity of an aircraft tire of a type having a plurality of primary nonskid grooves extending in a direction about the rotational axis of the tire, comprising providing each of at least the majority of said primary grooves with additional grooves of at least 1/8 inch width extending angularly of and from the respective primary grooves, terminating each of said additional grooves extending from a primary groove substantially short of the primary groove next adjacent the primary groove respectively associated with said additional groove, and spacing said additional grooves in a direction about said axis a minimum of one inch so as not to affect materially the tread life and dynamic properties of the tire.

12. The method as described in claim 11 comprising the provision of said additional grooves for each primary groove in a plurality of pairs of next adjacent primary grooves with the additional grooves for each primary groove in each of said pair thereof at least in part extending generally toward the other primary groove of the pair thereof a distance sufficient to overlap additional grooves extending in the opposite direction from said other primary groove.

13. The method described in claim 11 applied to a tire wherein said primary grooves are continuous, and including providing a plurality of additional grooves for each of said primary grooves.

References Cited

UNITED STATES PATENTS

| | | | |
|---|---|---|---|
| 1,293,528 | 2/1919 | Palmer | 152—352 |
| 1,360,907 | 11/1920 | Ernenwein | 152—324 |
| 2,696,863 | 12/1954 | Ewart et al. | 152—209 |
| 2,272,879 | 2/1942 | Hargraves | 152—209 |
| 3,384,143 | 5/1968 | Sommer | 152—209 |
| 3,409,064 | 11/1968 | Leonard | 152—209 |

ARTHUR L. LA POINT, Primary Examiner

C. B. LYON, Assistant Examiner